United States Patent
Peng

(10) Patent No.: US 9,473,666 B2
(45) Date of Patent: Oct. 18, 2016

(54) MULTIFUNCTIONAL BUSINESS MACHINE

(71) Applicant: Avision Inc., Hsinchu (TW)

(72) Inventor: Chao-Yu Peng, Hsinchu (TW)

( * ) Notice: Subject to any disclaimer, the term of this patent is extended or adjusted under 35 U.S.C. 154(b) by 0 days.

(21) Appl. No.: 14/986,949

(22) Filed: Jan. 4, 2016

(65) Prior Publication Data

US 2016/0198062 A1 Jul. 7, 2016

(30) Foreign Application Priority Data

Jan. 6, 2015 (TW) .............................. 104200101 U

(51) Int. Cl.
| | | |
|---|---|---|
| *H04N 1/04* | (2006.01) | |
| *H04N 1/203* | (2006.01) | |
| *H04N 1/12* | (2006.01) | |
| *H04N 1/00* | (2006.01) | |

(52) U.S. Cl.
CPC ........ *H04N 1/2034* (2013.01); *H04N 1/00551* (2013.01); *H04N 1/121* (2013.01); *H04N 2201/0094* (2013.01); *H04N 2201/0422* (2013.01)

(58) Field of Classification Search
CPC . H04N 1/2034; H04N 1/00551; H04N 1/121
USPC ......... 358/496, 498, 497, 401, 501; 399/380
See application file for complete search history.

(56) References Cited

U.S. PATENT DOCUMENTS

| | | | | | |
|---|---|---|---|---|---|
| 4,356,932 A * | 11/1982 | Wahlstrom | .............. | B04B 15/08 220/213 |
| 5,914,791 A * | 6/1999 | Lin | .................... | H04N 1/00519 358/474 |
| 6,233,426 B1 * | 5/2001 | Lee | ..................... | G03G 15/605 355/75 |
| 6,412,725 B2 * | 7/2002 | Inana | ............................ | 242/348 |
| 7,440,712 B2 * | 10/2008 | Uchida | .................. | G03G 15/60 399/107 |
| 7,460,281 B2 * | 12/2008 | Hsu | ..................... | H04N 1/00525 358/471 |
| 7,619,789 B2 * | 11/2009 | Kurokawa | ......... | H04N 1/00519 358/471 |
| 8,270,045 B2 * | 9/2012 | Iwata | ................... | G03G 15/605 16/21 |
| 8,786,918 B2 * | 7/2014 | De Muelenaere | . | H04N 1/00222 348/536 |
| 2002/0126325 A1 * | 9/2002 | Kawasaki | .......... | H04N 1/00554 358/474 |
| 2005/0196208 A1 * | 9/2005 | Lin | ..................... | H04N 1/00554 399/362 |
| 2006/0038018 A1 * | 2/2006 | Huang | .................. | G06F 1/1632 235/472.01 |
| 2006/0152774 A1 * | 7/2006 | Sheng | ................ | H04N 1/00519 358/474 |
| 2006/0176524 A1 * | 8/2006 | Willrich | ................ | G06F 1/1616 358/474 |
| 2007/0153336 A1 * | 7/2007 | Sheng | ..................... | H04N 1/028 358/474 |
| 2009/0021803 A1 * | 1/2009 | Tagawa | .............. | H04N 1/00968 358/488 |
| 2010/0002274 A1 * | 1/2010 | Lee | ......................... | H04N 1/121 358/498 |
| 2010/0296130 A1 * | 11/2010 | Lee | ..................... | H04N 1/00567 358/450 |
| 2015/0077815 A1 * | 3/2015 | Okazawa | .............. | H04N 1/0402 358/474 |
| 2015/0077816 A1 * | 3/2015 | Okazawa | .............. | H04N 1/2323 358/474 |
| 2015/0304513 A1 * | 10/2015 | Tu | ...................... | H04N 1/00557 358/1.13 |

* cited by examiner

*Primary Examiner* — Cheukfan Lee

(57) ABSTRACT

A multifunctional business machine includes a foldable-cover machine, a sheet-fed scanner and two fasteners. The foldable-cover machine has a cover and a platform covered by the cover. The sheet-fed scanner is disposed on the platform. One end of each fastener is fixed in one side of the cover, and another end of each fastener is configured with a shaft applied for pivoting the cover to the sheet-fed scanner. The cover rotates relative to the platform to be lifted with an angle and enable to lean against the sheet-fed scanner.

11 Claims, 6 Drawing Sheets

MULTIFUNCTIONAL BUSINESS MACHINE

The current application claims a foreign priority to application number 104200101 filed on Jan. 6, 2015 in Taiwan.

BACKGROUND OF THE INVENTION

1. Field of the Invention

The present invention relates to a multifunctional business machine, and more particularly, the present invention relates to a multifunctional business machine with a sheet-fed scanner.

2. Description of Related Art

In office, a multi-function printer (MFP) can enable a scanning process, a printing process, and a fax process independently, and also can connect to a computer through LAN for processing images scanned from papers and providing various images to output. However, the internal scanner of MFP is commonly a flatbed scanner, which can scan a single paper, but there still have many restrictions and inconvenience. For example, the flatbed scanner can't scan double-sided information of papers in one-time scanning process simultaneously, and a user need to open the cover, place the scanning papers, close the cover, and remove the papers repeatedly by manual operation. In addition, the flatbed scanner is also not suitable for scanning special types of papers, such as hard cards, business cards, or transparent files, wherein the transparent files like negatives, slides, or X-ray films.

At present, some MFP are configured with a U-shaped ADF (Automatic Document Feeder) for feeding automatically and scanning double-sided information of papers in one-time scanning process. However, these multifunctional business machines still can't scan hard cards, and the price of the U-shaped ADF is quite expensive.

SUMMARY OF THE INVENTION

Accordingly, an object of the present invention is to provide a multifunctional business machine with a sheet-fed scanner for meeting the requirements of scanning single paper, multiple papers, or special types of papers.

To achieve the foregoing and other objects, a multifunctional business machine is provided. The multifunctional business machine comprises a foldable-cover machine, a sheet-fed scanner, and two fasteners. The foldable-cover machine is configured with a cover and a platform covered by the cover. The sheet-fed scanner is disposed on the platform. One end of each fastener is fixed in one side of the cover, and another end of each fastener is configured with a shaft applied for pivoting the cover to the sheet-fed scanner. The cover rotates relative to the platform to be lifted with an angle and enable to lean against the sheet-fed scanner.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

In the present embodiment, a multifunctional business machine is provided for scanning papers with different requirements. For example, the multifunctional business machine is configured with an integral sheet-fed scanner which can scan the papers unsuited or inconvenient scanning in the MPF. The papers are such as hard cards, business cards, or transparent files, wherein the transparent files like films, slides, or X-ray films. The additional sheet-fed scanner is disposed on a platform of the multifunctional business machine, and being pivoted to a cover by a shaft, wherein the additional sheet-fed scanner can be power supplied by the multifunctional business machine or the external power independently. The multifunctional business machine can receive a scanning information outputted from the sheet-fed scanner, and then the scanning information will be outputted in a form of electronic file or e-mail. The scanning information also can be outputted by printing or fax. Therefore, an output module of the multifunctional business machine can process the scanning information by various ways according to different requirements, such as printing, fax, e-mail, or storing to mass storage device or network serve.

Preferred embodiments are disclosed below for elaborating upon the invention only and not as a limitation upon the scope of the invention.

First Embodiment

Figure 1:
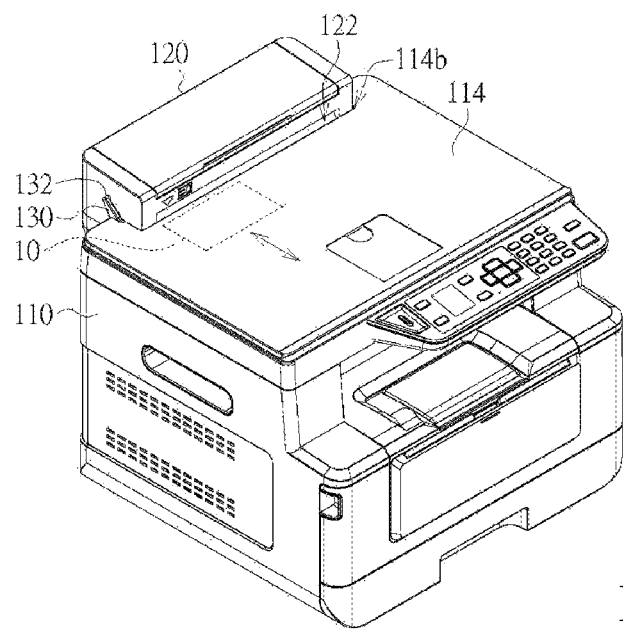
FIGS. 1-3 are schematic views showing a multifunctional business machine in an operating status according to one embodiment of the present invention.
Figure 2:
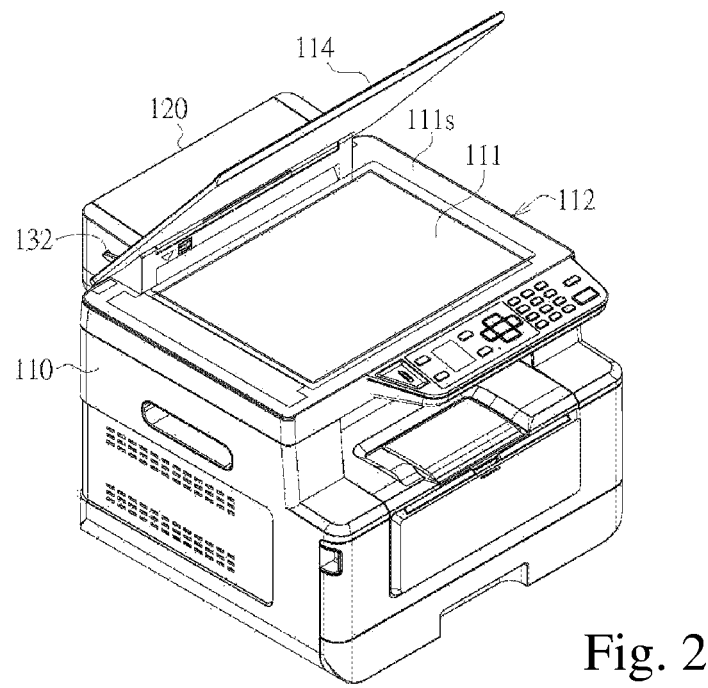
Figure 3:
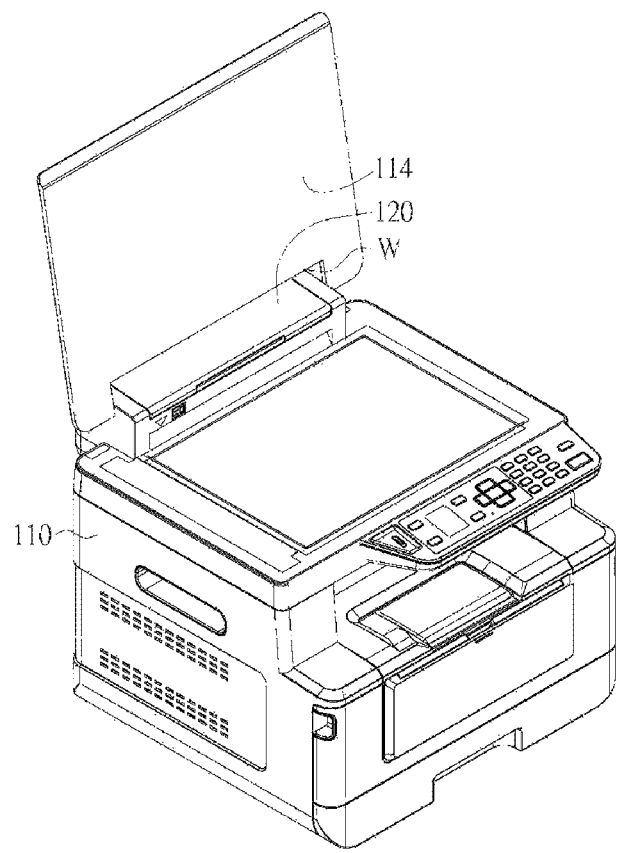

Referring to FIG. 1 to FIG. 3, FIGS. 1-3 are schematic views showing a multifunctional business machine 100 in an operating status according to one embodiment of the present invention. The multifunctional business machine 100 comprises a foldable-cover machine 110, a sheet-fed scanner 120, and two fasteners 130. The two fasteners 130 (jut shows one in FIG. 1) are disposed in the two relative sides of the sheet-fed scanner 120. The foldable-cover machine 110 has at least one function of scanning, printing, fax, and e-mail sending/receiving, wherein the sending/receiving ways as previously described. The sheet-fed scanner 120 is disposed on a platform 112 of the foldable-cover machine 110, and pivoted to a cover 114. In one embodiment, the sheet-fed scanner 120 is, for example, a double-sided contacting scanner, which has a contact image sensor (CIS) disposed therein. The contact image sensor can scan double-sided information of papers in one-time scanning process. Therefore, the user does not require to open the cover 114, place the scanning papers, close the cover 114, and remove the scanning papers repeatedly by manual operation.

As FIG. 1 shown, the sheet-fed scanner 120 comprises an opening portion 122 applied for papers feeding and papers outputting. In addition, a top surface 114a of the cover 114 is disposed near the opening portion 122 of the sheet-fed scanner 120 for being a carrying surface. Taking an example of scanning the hard cards 10, the hard cards 10 can be placed in one side of the opening portion 122 firstly, and then be drive to feed into the sheet-fed scanner 120 horizontally by a roller hided inside of the sheet-fed scanner 120. When the scanning process is finished, the hard cards 10 can be drive to eject out of the sheet-fed scanner 120 horizontally by the roller which rotates reversely. The sheet-fed scanner 120 with the design which the feeding opening and the outputting opening are disposed in the same side, is suitable for the scanning papers with inflexible or special materials.

Referring to FIG. 2, when the cover 114 is lifted, the papers can be placed on the platform 112, and then the platform 112 can be covered again by the cover 114. Wherein, the platform 112 has a window 111 for placing the papers. The material of the window 111 is, for example, glass or transparent polymer material. In addition, a flatbed scanner is disposed under the window 111 for scanning the papers placed on window. The flatbed scanner is suitable to scan all sizes of the papers made of reflective material, the sizes are such as A3, A4, or A5.

Figure 4A:
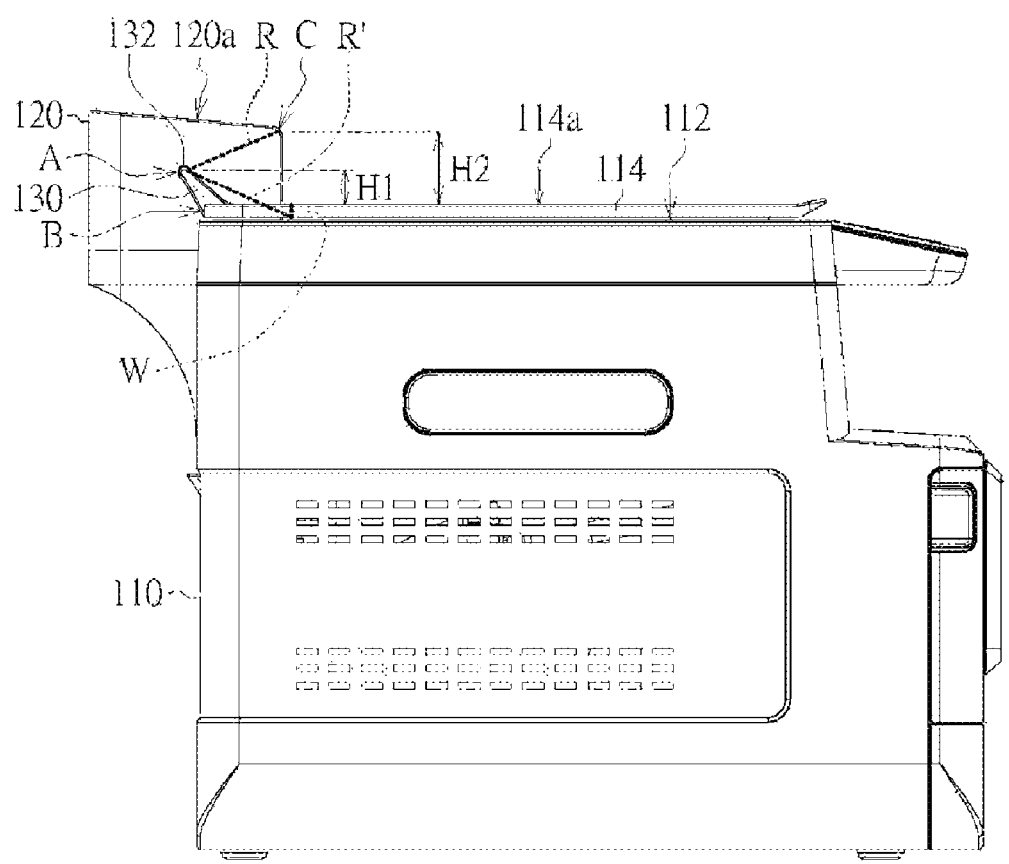
FIGS. 4A-4B are side views showing the multifunctional business machine depicted in FIG. 1.

Worth mention, the traditional cover is fixed in the platform by a pivot, the cover 114 of the present invention is pivoted to the sheet-fed scanner 120 by two fasteners 130. The cover 114 is configured with a notch 114b, wherein the notch 114b is used for accommodating the sheet-fed scanner 120. Referring to FIG. 4A, one end of each fastener 130 (connecting position B) is fixed in one side of the cover 114, another end of each fastener (pivotal position A) is configured with a shaft 132. Wherein, the shaft 132 is used for pivoting the cover 114 to the sheet-fed scanner 120.

In one embodiment, the window 111 is a rectangular surface structure, and a edge region 111s of the window 111 is a annular region. The window 111 is a transparent region, and the edge region 111s of the window 111 is a non-transparent region. Except covering the window 111, the cover 114 also cover the edge region 111s around the window 111 for blocking the external light incident into the window 111.

The cover 114 of the present invention is made of light-weight materials, which size is the same as the size of the platform 112 substantially. The sheet-fed scanner 120 is disposed in the edge region 111s where is disposed in one side of the window 111, wherein the position of the sheet-fed scanner 120 is corresponding to the notch 114b of the cover 114. The cover 114 covers the edge region 111s of the window 111 except portion of the edge region 111s corresponding to the notch. As FIG. 1 shown, when the platform 112 is covered by the cover 114, due to the disposing height of the opening portion 122 is slightly higher than the disposing height of the top surface of the cover 114, so that the opening portion 122 of the sheet-fed scanner 120 can be exposed near the notch 114b.

As FIG. 2 shown, the cover 114 can be lifted by the user, and rotates an angle relative to the platform 112. Then, referring to FIG. 3, when the cover-lifting angle is larger than a predestinate angle (the predestinate angle is, for example, 90°), the cover 114 will lean back and against the sheet-fed scanner 120. Therefore, the maximum lifting angle of the cover 114 can be restricted by the sheet-fed scanner 120 for preventing the rotating angle of the cover 114 too large and keeping the cover 114 in a appropriate operating location, which can promote efficiency. Due to the present invention applies the cover 114 with the foregoing protection mechanism, so that the bearing with smaller shaft diameter configuration and lighter load can be applied to the shaft 132 for having lower costs and reducing the abrasion of components, and the conventional bearing with large shaft diameter configuration and heavier load is not required. Thus, the cover 114 can be lifted efficiently due to the weight reduction of the cover 114.

Figure 4B:
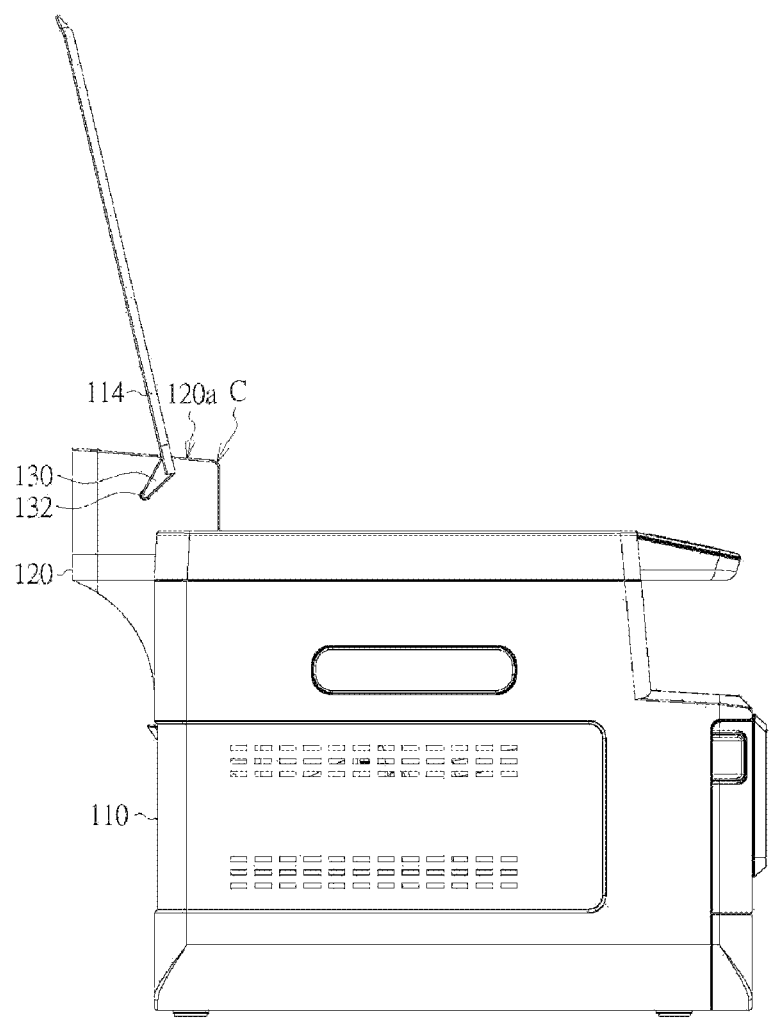

Referring to FIG. 4A and FIG. 4B, FIGS. 4A-4B are side views showing the multifunctional business machine 100 depicted in FIG. 1. The top surface 120a of the sheet-fed scanner 120 is extended out of the platform 112, which can be a leaning surface when the cover 114 is lifted. As FIG. 4A shown, the top surface 120a of the sheet-fed scanner 120 is higher than the top surface 114a of the cover 114, the position of the shaft 132 is disposed between the top surface 120a of the sheet-fed scanner 120 and the top surface 114a of the cover 114, the disposing height H1 of the shaft 132 is approximately half of the disposing height H2 of the top surface 120a. Therefore, the pivotal position A between the shaft 132 and the sheet-fed scanner 120 is higher than the connecting position B between the fastener 130 and the cover 114.

In addition, a straight line distance R is defined between the position of the shaft 132 and a corner C, and a rotating radius R' is defined between the notch side-wall of the cover 114 and the shaft 132, wherein the rotating radius R' need to be larger than the straight line distance R. Thus, when the cover 114 is lifted, the notch side-wall W of the cover 114 can rotate through the corner C in the minimum rotating radius, and continue to rotate backward until the cover 114 leans against the top surface 120a of the sheet-fed scanner 120, as shown in FIG. 4B.

In one embodiment, the fasteners 130 are connected to the top surface 114a of the cover 114 obliquely, and extended out of top surface 114a for connecting to the shaft 132. In the present invention, the position of the shaft 132 can be adjusted according to the structural variety of the fasteners 130. Besides, the connecting type between the fastener 130 and the shaft 132 can be applied a rod or other suitable components, the present invention is not limited to.

Second Embodiment

Figure 5:
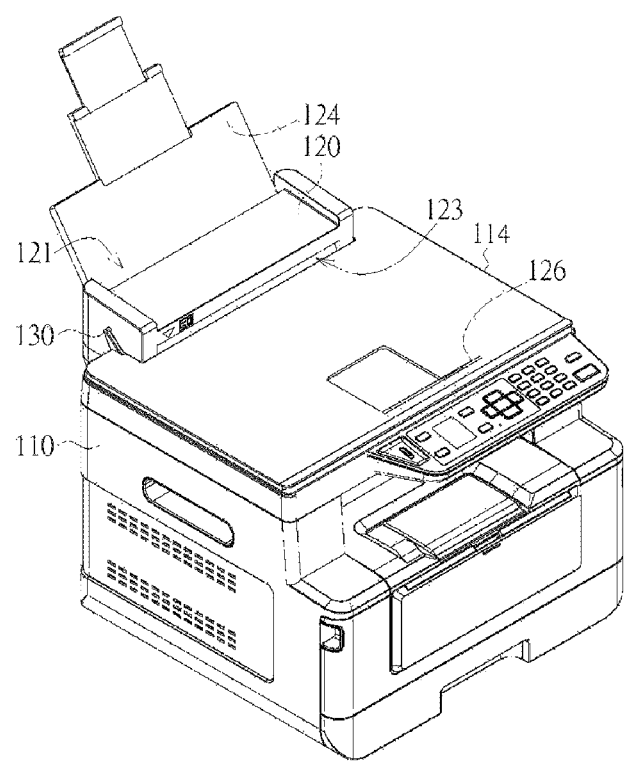
FIGS. 5-6 are schematic views showing a multifunctional business machine 101 according to another embodiment of the present invention.
Figure 6:
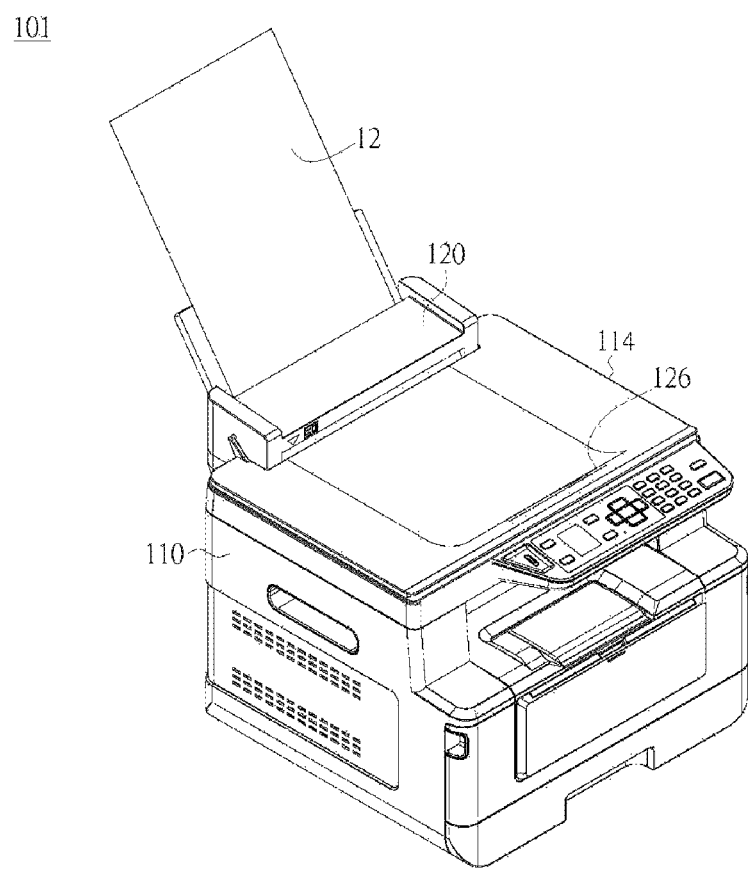

Referring to FIG. 5 and FIG. 6, FIGS. 5-6 are schematic views showing a multifunctional business machine 101 according to another embodiment of the present invention. The multifunctional business machine 101 comprises a foldable-cover machine 110, a sheet-fed scanner 120, and two fasteners 130. The disposing relations and operating methods about the foldable-cover machine 110, the sheet-fed scanner 120, and two fasteners 130 are similar to the structures of the multifunctional business machine 100 in the first embodiment, and the details will not be described herein again. Wherein, the identical elements are numbered the same.

The difference between the present embodiment and the first embodiment is: the sheet-fed scanner 120 comprises a feeding opening 121 and an outputting opening 123, wherein the feeding opening 121 and the outputting opening 123 are disposed in different sides. The outputting opening 123 is close to the side of the cover 114, and the top surface 114a of the cover 114 can be a carrying surface.

Taking the papers 12 prepared for scanning as an example, the papers 12 can be placed in tray 124 disposed in one side of the feeding opening 121 firstly, and then the papers 12 can be feed into the sheet-fed scanner 120 by the drive of a set of feeding rollers. When the scanning process is finished, the papers 12 can be drive to out of sheet-fed scanner 120 from the outputting opening 123 by a set of outputting rollers. The papers 12 are, for example, multiple A4 papers. The sheet-fed scanner 120 with the design which the feeding opening 121 and the outputting opening 123 are disposed in different sides, is suitable for flexible papers or multiple papers required mass scanning. In addition, the cover 114 further comprises a stopper 126, wherein the stopper 126 can be disposed on the top surface 114a of the cover 114 movably. When the stopper 126 is lifted, the papers 12 ejected from the outputting opening 123 can be stopped by the stopper 126. When the stopper 126 is not in use, the stopper 126 can be accommodated on the top surface 114a of the cover 114.

In the embodiment of the present invention, the multifunctional business machine is configured with a sheet-fed scanner for meeting the requirements of scanning single paper, multiple papers, or special types of papers (such as hard cards), and can add functions of the multifunctional business machine. In addition, the maximum lifting angle of the cover can be restricted by the sheet-fed scanner for preventing the rotating angle of the cover too large. Besides, the sheet-fed scanner is disposed on the platform, not disposed on the cover. Thus, the cover can be lifted efficiently due to the weight reduction of the cover. Further, in response to weight reduction of the cover, the bearing with smaller shaft diameter configuration and lighter load can be applied to the shaft 132 for having lower costs and reducing the abrasion of components.

While the disclosure has been described by way of example and in terms of the preferred embodiments, it is to be understood that the disclosure is not limited to the disclosed embodiments. To the contrary, it is intended to cover various modifications and the same arrangements (as would be apparent to those skilled in the art). Therefore, the scope of the appended claims should be accorded the broadest interpretation so as to encompass all such modifications and the same arrangements.

What is claimed is:

1. A multifunctional business machine, comprising:
    a foldable-cover machine, configured with a cover and a platform covered by the cover, wherein the platform has a window;
    a flatbed scanner, disposed under the window for scanning papers placed on the window;
    a sheet-fed scanner, disposed on the platform additionally and be without overlapping with the window; and
    two fasteners, one end of each fastener is fixed in one side of the cover, and another end of each fastener is configured with a shaft applied for pivoting the cover to the sheet-fed scanner;
    wherein, the cover rotates relative to the platform to be lifted with an angle and enable to lean against the sheet-fed scanner;
    wherein the sheet-fed scanner be without rotating with the rotation of the cover;
    wherein when the cover rotates relative to the platform and the window be without covering by the cover and the sheet-fed scanner, the distance between the sheet-fed scanner and the flatbed scanner is constant value and the relative position between the sheet-fed scanner and the flatbed scanner is constant.

2. The multifunctional business machine of claim 1, wherein the cover is configured with a notch, the notch is used for accommodating the sheet-fed scanner in the side of the cover.

3. The multifunctional business machine of claim 2, wherein the sheet-fed scanner is disposed in an outer edge region of the window, the cover covers the outer edge region of the window except portion of the edge region corresponding to the notch.

4. The multifunctional business machine of claim 1, wherein a top surface of the cover is disposed near an opening portion of the sheet-fed scanner for being a carrying surface.

5. The multifunctional business machine of claim 4, wherein the cover further comprises a stopper.

6. The multifunctional business machine of claim 4, wherein the top surface of the sheet-fed scanner is higher than the top surface of the cover, and the top surface of the sheet-fed scanner is extended out of the platform for being a leaning surface when the cover is lifted.

7. The multifunctional business machine of claim 4, wherein the two fasteners are connected to the top surface of the cover obliquely and extended out of the top surface.

8. The multifunctional business machine of claim 7, wherein a pivotal position between the shaft and the sheet-fed scanner is higher than a connecting position between the two fasteners and the cover.

9. The multifunctional business machine of claim 1, wherein the angle is larger than 90°.

10. The multifunctional business machine of claim 1, wherein the sheet-fed scanner comprises a feeding opening and an outputting opening, the outputting opening is close to the side of the cover.

11. The multifunctional business machine of claim 1, wherein the sheet-fed scanner comprises an opening portion for papers feeding and papers outputting.

* * * * *